(12) United States Patent
Garrido et al.

(10) Patent No.: US 7,922,448 B2
(45) Date of Patent: Apr. 12, 2011

(54) DIFFERENTIAL VIBRATION CONTROL FOR WIND TURBINES

(75) Inventors: Alvaro Calle Garrido, Madrid (ES); Eugenio Yegro, Madrid (ES); Manuel Huerta Crespo, Madrid (ES); Pedro L. Benito, Rheine (DE)

(73) Assignee: General Electric Company, Schenectady, NY (US)

( * ) Notice: Subject to any disclaimer, the term of this patent is extended or adjusted under 35 U.S.C. 154(b) by 242 days.

(21) Appl. No.: 12/233,674

(22) Filed: Sep. 19, 2008

(65) Prior Publication Data

US 2010/0074749 A1    Mar. 25, 2010

(51) Int. Cl.
*F03D 11/00* (2006.01)

(52) U.S. Cl. .......................................... 416/1

(58) Field of Classification Search .................. 416/1
See application file for complete search history.

(56) References Cited

U.S. PATENT DOCUMENTS

| 4,420,692 | A | 12/1983 | Kos et al. | |
| 6,876,099 | B2 * | 4/2005 | Wobben | 290/44 |
| 2009/0266160 | A1 * | 10/2009 | Jeffrey et al. | 73/455 |

* cited by examiner

*Primary Examiner* — Richard Edgar
(74) *Attorney, Agent, or Firm* — William F. Heinze; Ernest G. Cusick; Frank A. Landgraff

(57) ABSTRACT

A wind turbine includes a first vibration sensor for producing a first vibration signal; a second vibration sensor, displaced from the first vibration sensor, for producing a second vibration signal; and a processor for comparing the first vibration signal to the second vibration signal and controlling the wind turbine in response to the comparison.

16 Claims, 3 Drawing Sheets

DIFFERENTIAL VIBRATION CONTROL FOR WIND TURBINES

BACKGROUND OF THE INVENTION

1. Technical Field

The subject matter described here generally relates to wind turbines, and, more particularly, to differential vibration sensing and control of wind turbines.

2. Related Art

A wind turbine is a machine for converting the kinetic energy in wind into mechanical energy. If the mechanical energy is used directly by the machinery, such as to pump water or to grind wheat, then the wind turbine may be referred to as a windmill. Similarly, if the mechanical energy is converted to electricity, then the machine may also be referred to as a wind generator or wind power plant.

Vibrations in various components of a wind turbine may considerably reduce the life of those components and/or lead to early fatigue failures. These vibrations are typically measured with respect to a stationary reference point using accelerometers arranged at critical locations on the components of interest. However, such conventional approaches to vibration sensing do not adequately protect the wind turbine and can lead to unnecessary system shutdown "trips."

BRIEF DESCRIPTION OF THE INVENTION

These and other drawbacks associated with such conventional approaches are addressed here in by providing, in various embodiments, a wind turbine including a first vibration sensor for producing a first vibration signal; a second vibration sensor, displaced from the first vibration sensor, for producing a second vibration signal; and a processor for comparing the first vibration signal to the second vibration signal and controlling the wind turbine in response to the comparison. Also provided is a method of operating a wind turbine including sensing vibration at a first location on the wind turbine; sensing vibration at a second location on the wind turbine; comparing the sensed vibration at the first location to the sensed vibration at the second location; and controlling the wind turbine in response to an outcome of the comparing step.

BRIEF DESCRIPTION OF THE DRAWINGS

Various aspects of this technology will now be described with reference to the following figures ("FIGS.") which are not necessarily drawn to scale, but use the same reference numerals to designate corresponding parts throughout each of the several views.

DETAILED DESCRIPTION OF THE INVENTION

Figure 1:
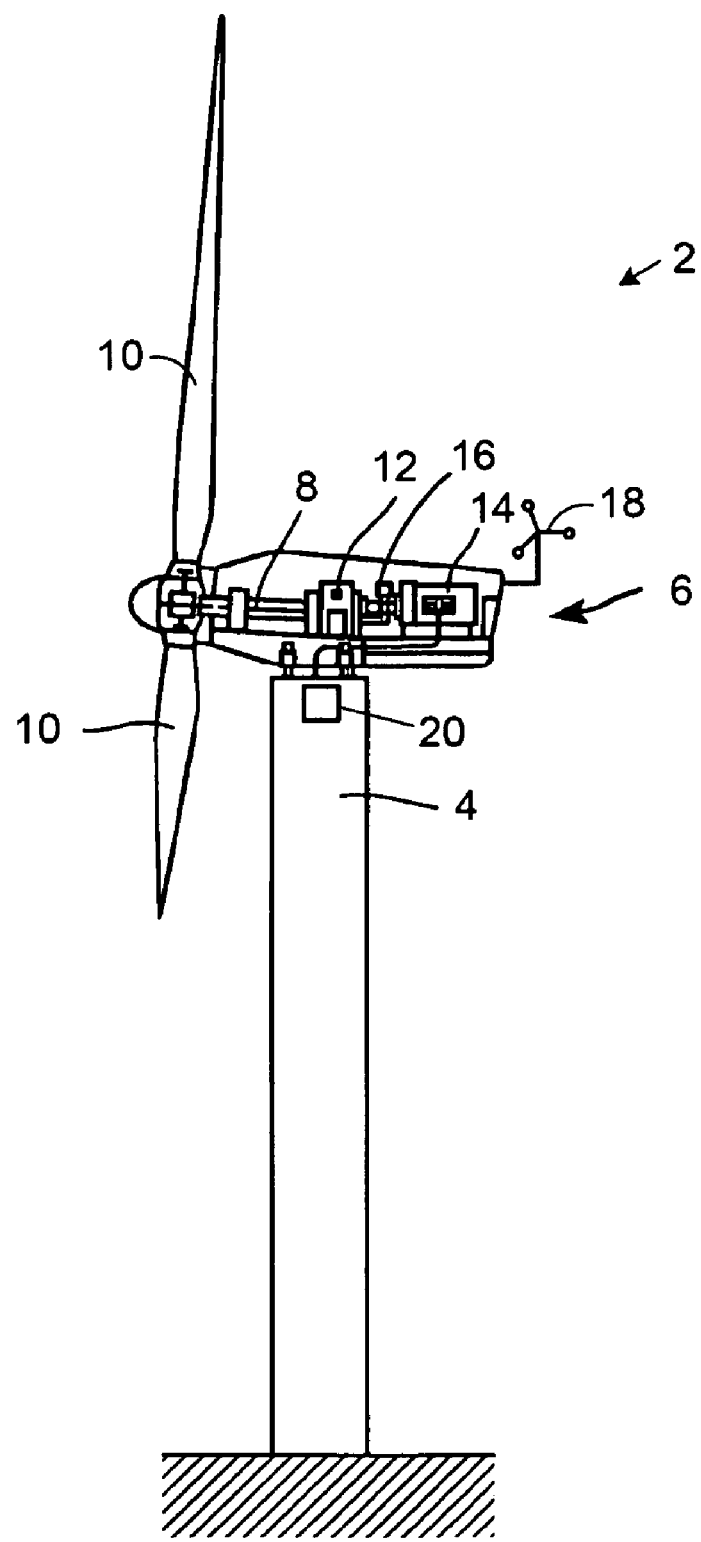
FIG. 1 is a schematic side view of a wind generator.

FIG. 1 illustrates one example of a wind turbine 2. This particular configuration for a wind generator type turbine includes a tower 4 supporting a nacelle 6 enclosing a drive train 8. The blades 10 are arranged on a hub to form a "rotor" at one end of the drive train 8 outside of the nacelle 6. The rotating blades 10 drive a gearbox 12 connected to an electrical generator 14 at the other end of the drive train 8 along with a control system 16 that may receive input from an anemometer 18. A first or tower vibration sensor 20 is arranged on the tower 4, such as near the top of the tower, or at any other location on the tower. Other vibration sensors may also be arranged at other locations on the tower 4 and/or at other locations on the wind turbine 2.

Figure 2:
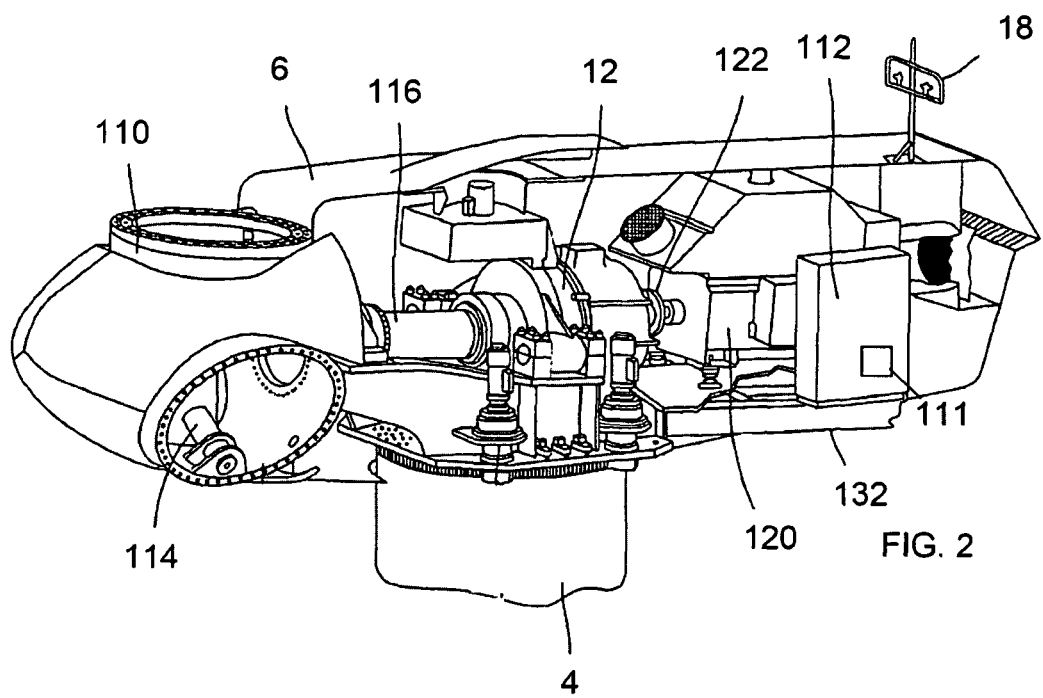
FIG. 2 is a cut-away orthographic view of the nacelle and huh of the wind generator shown in FIG. 1.

FIG. 2 is a cut-away orthographic view of the nacelle 6 and hub 110 of the wind turbine 2 shown in FIG. 1. The drive train 8 of the wind turbine 2 (shown in FIG. 1) includes a main rotor shaft 116 connected to hub 110 and the gear box 12. The control system 16 (in FIG. 1) includes one or more processors, such as microcontrollers 111 within the panel 112, which provide signals to control the variable pitch blade drive 114 and/or other components of the wind turbine 2. A high speed shaft (not shown in FIG. 2) is used to drive a first generator 120 via coupling 122. Various components in the nacelle 6 are be supported by a frame 132.

Figure 3:
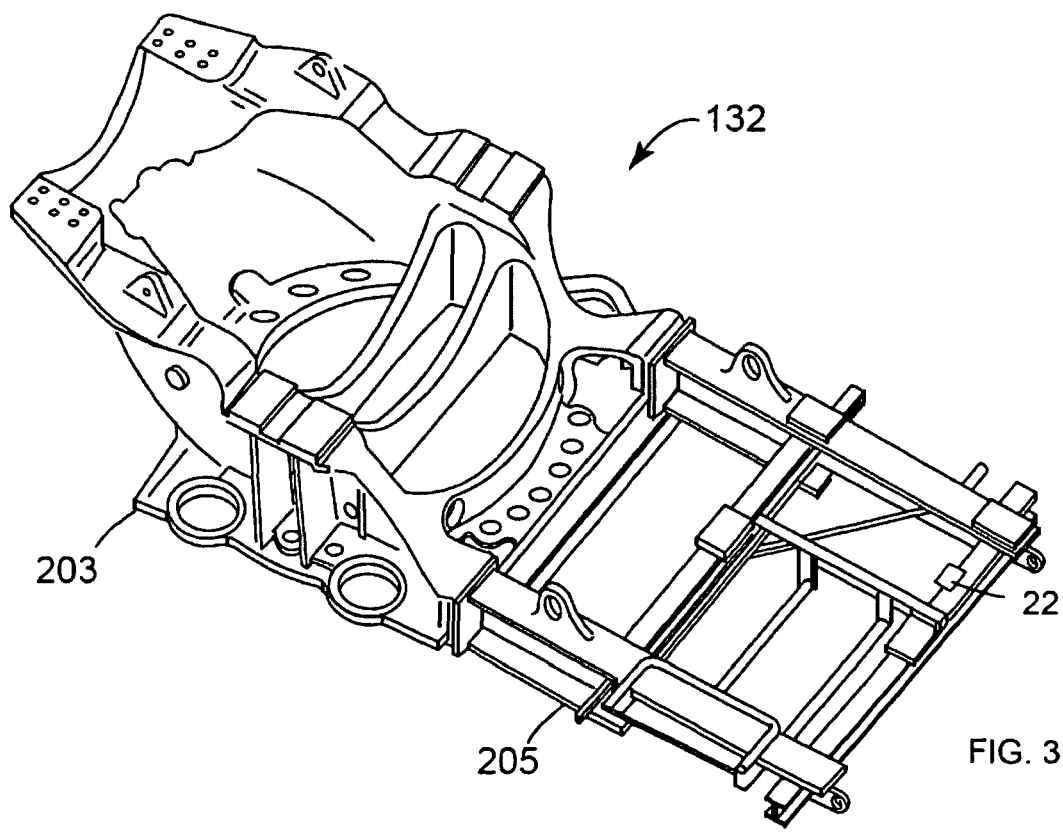
FIG. 3 is an orthographic view of a frame for the nacelle shown in FIG. 2.

FIG. 3 is an orthographic view of the frame 132 from the nacelle 6 shown in FIG. 2. As illustrated in FIG. 3, the frame 132 typically includes a main frame, or "bedplate," 203, and generator support frame, or "rear frame," 205 that is typically cantilevered from the bedplate. A second or frame vibration sensor 22 is secured to the frame 132, such as near the end of the rear frame 205, for measuring lateral and vertical vibrations. Alternatively, or in addition, other vibration sensors may be secured to other locations on the rear frame 205, to the bedplate 203, and/or at other locations on the wind turbine 2.

Each of the vibration sensors 20 and/or 22 includes a motion sensor for measuring acceleration, velocity, and/or displacement in one or more dimensions. For example, the vibration sensors 20 and/or 22 may be tri-axial or biaxial, measuring lateral and longitudinal vibrations in the time domain. Other process variables besides vibration, such as displacement, velocity, temperature, and/or pressure, may also be similarly sensed at various turbine locations in a similar manner. The vibration sensors 20 and 22 are arranged to communicate with the control system 16. For example, the vibrations sensors 20 and 22 may be arranged to communicate with a local or remote processor such as the microcontroller 111 via wired and/or wireless means.

Figure 4:
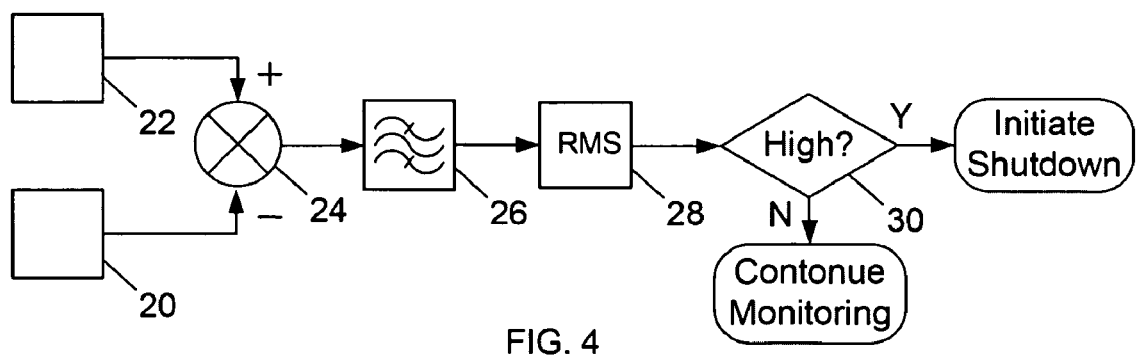
FIG. 4 is a schematic control diagram.

As illustrated in the schematic control diagram for microcontroller 111 shown in FIG. 4, some or all of the vertical and/or lateral outputs from the frame vibration sensor 20 are compared to some or all of the corresponding outputs from the tower vibration sensor 22. This may be accomplished by a comparator, such as the illustrated adder 24, or other device, in order to provide a "differential vibration" signal. In the particular example illustrated here, the lateral acceleration signal from the tower vibration sensor 20 is subtracted from the lateral acceleration signal provided by the rear frame vibration sensor 22. Alternatively, or in addition, the vertical acceleration signal from the tower vibration sensor 20 may subtracted from the vertical acceleration signal provided by the rear frame vibration sensor 22. Signals on other axes may be compared in a similar manner.

In this manner, the output signal from the adder 24 is referenced against vibrations sensed in the tower 4 rather than at a stationary reference such as ground. In other words, the cumulative effect of tower vibrations are removed from the output of the adder 24, so that the signal corresponds more closely to just the vibrations caused by equipment near the rear frame 205. Relative movement between the tower 4 and frame 205 are therefore more accurately accounted for. Other vibration sensors may also be used so that the output from the second sensor 22, and/or other sensors, is referenced against vibrations sensed at any other location in the wind turbine 4.

A filter 26 may be optionally applied to the signal from the adder 24 in order to exclude frequencies and/or times which are not of interest. However, the filter 26 may also be applied to the signals from other locations, including to the output from the vibration sensors 20 and 22. Other types of signal processing beside filtering may also be used, such as amplification and/or noise reduction. The "filtered differential vibration signal" from the filter 26 is them sent to an optional adjuster 28 for further processing. For example, the adjuster 28 may be used to calculate a root mean square "RMS" and/or other statistical measure for evaluating whether the "adjusted and filtered differential vibration signal" is within normal operating parameters. The adder 24, filter 26, and/or adjuster 28 may be implemented as part of the microcontroller 111 (in FIG. 2) or other processor that is arranged local to or remote from for the wind turbine 2.

The differential, filtered differential, and/or adjusted filtered differential signals can then be made at decision point 30 to take further action based upon whether the signal is above a threshold. For example, the adjusted signal may be used to initiate an automatic or manual shutdown "trip" of the wind turbine 2 during periods of excessive vibration when the RMS value rises above a predetermined set point. Such trips may be implemented, for example, by causing variable pitch blade drives 114 to rotate the blades 10 to a feathered position. Other process variables may also be taken into consideration before making a initiating a turbine shut down, or other process change, at decision point 30.

In one example where lateral vibration signals from the tower 4 and rear frame 205 were compared in the manner described above, peak vibration amplitudes were reduced 34% and RMS values were reduced 33%. For vertical vibrations, peak vibration amplitudes were reduced 14% and RMS values were reduced 15%. It is therefore expected that, by more accurately measuring the vibration levels at the rear frame 205, unnecessary turbine shutdowns for excessive vibration may be avoided using the various techniques described above.

It should be emphasized that the embodiments described above, and particularly any "preferred" embodiments, are merely examples of various implementations that have been set forth here to provide a clear understanding of various aspects of this technology. One of ordinary skill will be able to alter many of these embodiments without substantially departing from scope of protection defined solely by the proper construction of the following claims.

What is claimed is:

1. A wind turbine, comprising:
   a first vibration sensor for producing a first vibration signal;
   a second vibration sensor, displaced from the first vibration sensor, for producing a second vibration signal; and
   a processor for comparing the first vibration signal to the second vibration signal and controlling the wind turbine in response to the comparison.

2. The wind turbine recited in claim 1, wherein the comparison comprises subtracting the first vibration signal from the second vibration signal to create a differential vibration signal.

3. The wind turbine recited in claim 2, wherein the processor comprises a filter for filtering the differential vibration signal.

4. The wind turbine recited in claim 3, wherein the filter comprises a frequency filter.

5. The wind turbine recited in claim 2, wherein the processor comprises an adjuster for adjusting the differential vibration signal.

6. The wind turbine recited in claim 5, wherein the adjuster calculates a root mean square of the differential vibration signal.

7. The wind turbine recited in claim 2, wherein the controlling comprises initiating shutdown of the wind turbine in response to a high differential vibration signal.

8. The wind turbine recited in claim 1, wherein the first vibration sensor is arranged on a tower of the wind turbine and the second vibration sensor is arranged on a rear frame of the wind turbine.

9. A wind turbine, comprising:
   a tower;
   a frame supported by the tower;
   a first vibration sensor, arranged on the tower, for producing a first vibration signal;
   a second vibration sensor, arranged on the frame, for producing a second vibration signal; and
   a processor for subtracting the first vibration signal from the second vibration signal to create a differential vibration signal, and for controlling the wind turbine in response to the differential vibration signal.

10. The wind turbine recited in claim 9, wherein the processor comprises a frequency filter for filtering the differential vibration signal.

11. The wind turbine recited in claim 10, wherein the processor comprises an adjuster for calculating a root mean square value of the differential vibration signal.

12. The wind turbine recited in claim 11, wherein the controlling comprises initiating shutdown of the wind turbine in response to a high root mean square value of the differential vibration signal.

13. The wind turbine recited in claim 10, wherein the controlling comprises initiating shutdown of the wind turbine in response to a high differential vibration signal.

14. The wind turbine recited in claim 9, wherein the processor comprises an adjuster for calculating a root mean square of the differential vibration signal.

15. The wind turbine recited in claim 14, wherein the controlling comprises initiating shutdown of the wind turbine in response to a high root mean square value of the differential vibration signal.

16. The wind turbine recited in claim 9, wherein the controlling comprises initiating shutdown of the wind turbine in response to a high differential vibration signal.

* * * * *